N. ALLSTATTER.
Harvester Rake.

No. 42,454.  Patented April 26, 1864.

WITNESSES:
J. W. Coombs
Henry Morry

INVENTOR:
Nicholas Allstatter
per Munn & Co
Attorneys

UNITED STATES PATENT OFFICE.

N. ALLSTATTER, OF HAMILTON, OHIO.

IMPROVEMENT IN RAKES FOR HARVESTERS.

Specification forming part of Letters Patent No. 42,454, dated April 26, 1864.

*To all whom it may concern:*

Be it known that I, NICHOLAS ALLSTATTER, of Hamilton, in the county of Butler and State of Ohio, have invented a new and Improved Raking Attachment for Harvesters; and I do hereby declare that the following is a full, clear, and exact description of the same, reference being had to the accompanying drawings, making a part of this specification, in which—

Figure 1:
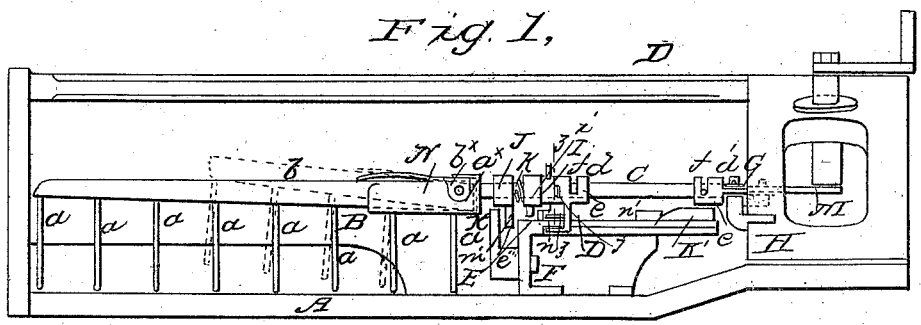
Figure 2:
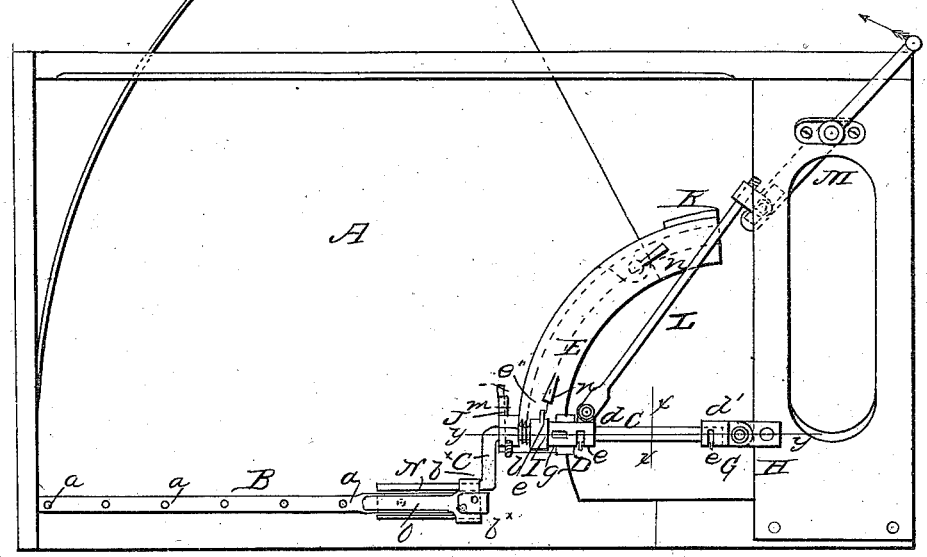
Figure 3:
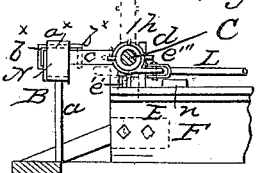
Figure 4:
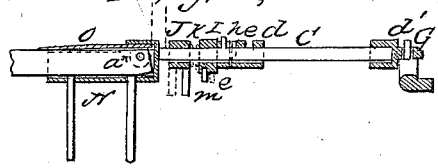
Figures 5, 6:
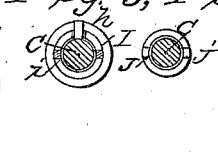

Figure 1 is a front view of my invention; Fig. 2, a plan or top view of the same; Fig. 3, a vertical section of the same, taken in the line $x\,x\,x\,x$, Fig. 2; Fig. 4, a vertical section of the same, taken in the line $y\,y$, Fig. 2; Fig. 5, a vertical section of the same, taken in the line $z\,z$, Fig. 1; Fig. 6, a vertical section taken in the same line, $z\,z$, as Fig. 5, but looking in the opposite direction.

Similar letters of reference indicate corresponding parts in the several figures.

This invention relates to a new and improved raking attachment for harvesters of that class in which the rake is made to move or sweep forward and backward over the platform in the arc of a circle. The invention consists in the peculiar means employed for operating or giving motion to the rake, and having the rake-head provided with a joint, as hereinafter fully shown and described, whereby it is believed that a very simple, efficient, and durable rake-operating mechanism is obtained, and one which may be driven by a moderate application of power and economically constructed and applied.

To enable those skilled in the art to fully understand and construct my invention, I will proceed to describe it.

A represents the platform of a reaper, which is of segment form, as shown in Fig. 2; and B represents a rake which may be constructed in the usual way—to wit, of teeth $a$, attached at right angles to a head, $b$. The head $b$ of the rake is permanently attached to a shaft, C, formed with a crank, $c$, the rake B being at one side of the crank $c$, and the portion of the shaft at the opposite side of the crank being fitted in bearings $d\,d'$, one of which, $d$, is at the upper end of a slide, D, which is fitted on a curved or segment plate, E, at the upper end of a suitable support, F, which is secured to the platform A. The other bearing, $d'$, is fitted on a pin, G, secured to the frame H of the machine, (see Figs. 1 and 2,) the bearing $d'$ being allowed to turn freely on said pin. The shaft C is allowed to turn in the bearings $d\,d'$; but said turning movement is limited by means of two pins, $e\,e$, attached to the shaft, said pins passing through slots $f$, made circumferentially in the bearings. (See more particularly Figs. 1 and 2.)

On the shaft C there is placed loosely a thimble, I, which has a slot, $g$, made longitudinally in it at one end to receive a pin, $h$, attached to shaft C, and at the same end of the thimble I there are two projections, $i\,i$, which fit in recesses $j$, made in the adjoining end of the bearing $d$ of the shaft C. The thimble I is provided with two pins, $e''\,e'''$, and a spiral spring, $k$, is placed on the shaft C, between the thimble I and a collar, J, secured on the shaft C by a set-screw, $l$, said spring $k$ having a tendency to keep the projections $i$ of the thimble in the recesses $j$ of the bearing $d$. The collar J has two arms, $m\,m'$, extending from it at right angles with each other, and at each end of the plate E there is a vertical curved plate, said plates being designated by the letters K K'. One of these plates, K, is in line with the arm $m$, and the other plate, K', in line with the arm $m'$ of the collar J.

On the plate E there are secured two oblique plates, $n\,n'$, one of which, $n$, is in line with the pin $e''$ of the thimble I, and the other, $n'$, in line with the pin $e'''$ of said thimble.

To the bearing $d$ there is attached a rod, L, the back end of which is connected to a crank, M, in the back part of the frame of the machine.

The operation is as follows: As the machine is drawn along the crank M is rotated either by a direct application of power or from the driving-wheel of the machine, and a forward and backward movement is communicated to the shaft C and rake B, the latter sweeping over the platform A. As the rake B moves toward the front of the platform A it is elevated, its teeth being in a horizontal position, as shown in red in Fig. 3, the rake-shaft C being prevented from turning and the rake consequently retained in position in consequence of the projections $i$ on the thimble I fitting in the recesses $j$ of the bearing $d$, as shown clearly in Fig. 1. As the rake B approaches the termination of its forward movement the pin $e''$ of the thimble I comes in contact with the oblique plate $n$, which throws the thimble I outward and free from the bearing $d$ of the shaft C, and when the thimble is thus thrown out from the bearing the arm $m$ of the collar J will strike the curved plate K and cause the shaft C to be turned one-quarter of a revolution, which will bring the rake-teeth down on the platform A, and when the rake assumes this position the pin $e''$ will have cleared the oblique plate $n$, and the spring $k$ throws the thimble I in connection again with the bearing $d$, and the rake is retained in a working position while being drawn back over the platform and raking the grain therefrom. As the rake approaches the termination of its backward movement the pin $e'''$ of the thimble I comes in contact with the oblique plate $n'$, and the thimble I is thrown outward and free from the bearing $d$, and the arm $m'$ of the collar J strikes the curved plate K' and turns the shaft C so that the rake will be again in an upward position to move toward the front end of the platform, the thimble I being thrown by the spring $k$ into connection with the bearing $d$ when the rake is elevated, so as to retain the latter in such position while it is moving toward the front end of the platform. Thus by this simple arrangement the rake is made to sweep back over the platform to rake the cut grain therefrom, and in moving forward for a succeeding return-stroke is elevated so as to clear the platform and offer no obstruction to the grain while falling on the platform.

The rake-head $b$ should, in order to operate or work perfectly, be provided with a joint, so that it may conform to the vibrations of the platform A as the same passes over uneven ground. This arrangement of the joint is as follows:

The crank $c$ of the shaft C is attached to a metal box, N, open at the top, and the rake-head $b$ is fitted in said box and secured therein by a pivot or bolt, $a^x$, which passes transversely through the box N and the rake-head, and to said box there is attached a spring, O, the outer end of which bears upon the rake-head and has a tendency to keep it in line with the box N, said spring being provided with a lip, $b^x$, at each side of it, through which the bolt $a^x$ passes. By this arrangement the rake is allowed to yield or give to the vibrations of the platform, and the former protected from any undue strain consequent on such movement of the platform. The spring O also regulates the pressure of the rake on the grain, and when the latter is of heavy growth and a considerable quantity laid on the platform at each forward movement of the rake the spring O will cause the teeth $a$ to penetrate into the grain a requisite distance only to insure it being raked off from the platform, whereas a rigid rake would be forced down entirely through the mass of grain and be subjected to much strain thereby.

I do not claim broadly a rake for harvesters moving back and forth over the platform thereof in the arc of a circle or in a curved path, for that is an old and well-known device; but I do claim as new and desire to secure by Letters Patent—

1. The rake-shaft C, provided with a crank, $c$, in connection with the sliding clutch-thimble I, provided with the arms $m$ $m'$, oblique plates $n$ $n'$ on the segment-plate E, and the curved plates K K', all arranged for joint operation as and for the purpose herein set forth.

2. In combination with the parts specified in the foregoing claim, the flexible or jointed rake-head arranged to operate in the manner substantially as and for the purpose herein set forth.

NICHOLAS ALLSTATTER.

Witnesses:
JOHN DEINZER,
ROBERT ALLSTATTER.